(12) United States Patent
Oscar et al.

(10) Patent No.: US 12,117,077 B2
(45) Date of Patent: Oct. 15, 2024

(54) MACHINE TO RECOVER A CABLE

(71) Applicant: TESMEC S.P.A., Milan (IT)

(72) Inventors: Alberto Oscar, Castro (IT); Fabrizio Parodi, Presezzo (IT); Roberto Pedrocchi, Solto Collina (IT)

(73) Assignee: TESMEC S.P.A., Milan (IT)

( * ) Notice: Subject to any disclaimer, the term of this patent is extended or adjusted under 35 U.S.C. 154(b) by 608 days.

(21) Appl. No.: 17/604,302

(22) PCT Filed: Apr. 17, 2020

(86) PCT No.: PCT/IT2020/050097
§ 371 (c)(1),
(2) Date: Oct. 15, 2021

(87) PCT Pub. No.: WO2020/213019
PCT Pub. Date: Oct. 22, 2020

(65) Prior Publication Data
US 2022/0205533 A1   Jun. 30, 2022

(30) Foreign Application Priority Data
Apr. 18, 2019   (IT) .......................... 102019000006098

(51) Int. Cl.
*F16H 61/4017*   (2010.01)
*F16H 39/02*   (2006.01)
*F16H 61/431*   (2010.01)
*H02G 1/04*   (2006.01)

(52) U.S. Cl.
CPC ......... *F16H 61/4017* (2013.01); *F16H 39/02* (2013.01); *F16H 61/431* (2013.01); *H02G 1/04* (2013.01)

(58) Field of Classification Search
CPC ............. F16H 61/4017; F16H 61/4157; F16H 61/431; H02G 1/04
See application file for complete search history.

(56) References Cited

U.S. PATENT DOCUMENTS

| | | | | |
|---|---|---|---|---|
| 5,678,463 A * | 10/1997 | Brambilla | ............. | F16H 61/431 74/731.1 |
| 6,915,631 B2 * | 7/2005 | Kado | .................... | F16H 61/438 60/423 |
| 7,093,433 B2 * | 8/2006 | Belluschi | ............... | F15B 11/055 60/452 |
| 9,863,532 B2 * | 1/2018 | Lasaar | ................ | F16H 61/4192 |
| 10,109,988 B2 * | 10/2018 | Oscar | ........................ | H02G 1/04 |
| 10,821,825 B2 * | 11/2020 | Sohier | .................. | B60K 17/356 |
| 10,955,052 B2 * | 3/2021 | Hoegerle | ............. | F16H 61/435 |
| 11,079,013 B2 * | 8/2021 | Oscar | ........................ | H02G 1/06 |

(Continued)

FOREIGN PATENT DOCUMENTS

DE   102012221944 A1   6/2014
EP   1610040 A1   12/2005
(Continued)

*Primary Examiner* — Michael Leslie
(74) *Attorney, Agent, or Firm* — Maine Cernota & Curran (57) ABSTRACT

Machine to recover a cable, comprising at least one hydraulic pump with variable cubic capacity, provided with a system to adjust the cubic capacity, driven by a servo controller, and at least one hydraulic motor fed by said hydraulic pump by means of at least one pipe to deliver a fluid and at least one pipe to return the fluid.

10 Claims, 10 Drawing Sheets

(56) References Cited

U.S. PATENT DOCUMENTS

| | | | |
|---|---|---|---|
| 11,326,324 B2* | 5/2022 | Oasa | ................. E02F 9/2253 |
| 11,522,349 B2* | 12/2022 | Colleoni | ................ H02G 1/04 |
| 2005/0089374 A1 | 4/2005 | Belluschi | |

FOREIGN PATENT DOCUMENTS

| | | |
|---|---|---|
| EP | 2975304 A1 | 1/2016 |
| WO | 2019058301 A1 | 3/2019 |

* cited by examiner fig. 2 fig. 3 fig. 4 fig. 5 fig. 6 fig. 7 fig. 8 fig. 9 fig. 10

MACHINE TO RECOVER A CABLE

RELATED APPLICATIONS

This application is a national phase application filed under 35 USC § 371 of PCT Application No. PCT/IT2020/050097 with an International filing date of Apr. 17, 2020, which claims priority of IT patent application 102019000006098 filed Apr. 18, 2019. Each of these applications is herein incorporated by reference in its entirety for all purposes.

FIELD OF THE INVENTION

The present invention concerns a cable recovery machine, usable, in particular, in a plant, for example, for stringing a high voltage overhead power line and in general in overhead lines which provide the so-called "braked" stringing of cables, or overhead conductors.

In particular, the present invention concerns a cable recovery machine equipped with an adjustment device able to guarantee maximum safety in cable recovery operations.

BACKGROUND OF THE INVENTION

It is known that the traditional system for stringing an electric line provides the so-called "braked" stringing by means of machines with multiple capstans: a winch machine, which recovers a cable, such as for example a steel cable with a drawing function, and a brake machine, which applies a controlled tension to the conductors in the stringing step so as to ensure that they can remain suspended to the appropriate guide devices provided on the intermediate supports, so that they do not slide on the ground or against obstacles under the conductors themselves, such as road or rail crossings, the intersection of other power lines and so on. Moreover, it is increasingly widespread to use a helicopter to tow the pilot cable from the brake station to the winch station, or, sometimes, even to tow the final conductor, thus eliminating the winch machine in this operation.

The same concepts apply to the aerial stringing of guard cables with fiber optic core (OPGW) or without fiber optic core (GW).

The braked stringing technology can also be applied in stringing the electric catenary for railway traction, with the difference that the brake machine is mounted on a translating wagon, which can be self-propelled or towed, and thanks to the movement of the wagon, the brake releases the contact cable or the suspension cable with controlled tension.

Traditional winch machines for braked stringing can be equipped with a hydraulic motor cooperating with a hydraulic pump with a variable cubic capacity, connected in a closed circuit, controlled by a device that limits and controls the overload, which prevents situations of serious overload along the path of the strung cables.

One of such control devices that limit and control the overload is described in Italian patent application No. 102016000021986, belonging to the Applicant of the present application.

According to this solution, the device that limits and controls the overload substantially consists of an element external to the pump, which, once the set value has been reached, sends a pressure signal directly to the actuator of the plate or shutter of the pump, thus controlling its cubic capacity. If despite the reduction in the cubic capacity, the pressure does not drop below the set value, the system continues to move the pump shutter, reversing the direction of flow; in this way the cable is in any case unwound by the machine with a certain controlled tension.

This device can be improved above all from the point of view of safety, that is, the maintenance of a drawing action on the cable, since even in emergency situations, such as the presence of excessive drawing force on the cable, the device still allows to unwind the cable with a controlled tension. In fact, the possibility that the cable can be unwound even in overload situations does not guarantee complete safety in the stringing operations.

Substantially, therefore, the known device that limits and controls the overload is not able to bring the hydraulic pump to a cubic capacity such as to stop the movement of the hydraulic motor while maintaining the set pressure, which would allow to maintain the drawing action on the line and therefore not release the cable or conductor.

There is therefore a need to perfect a cable recovery machine which can overcome at least one of the disadvantages of the state of the art.

One purpose of the present invention is therefore to provide a cable recovery machine which is equipped with an effective safety system during each step of the cable-stringing operations.

Another purpose of the present invention is to provide a cable recovery machine which can be used effectively in cable-stringing operations, in particular a recovery machine which guarantees high safety in operations and which allows to avoid any releasing of the cable on the strung line, thus always maintaining a suitable tension on the strung cable.

Another purpose of the present invention is to provide a cable recovery machine which, in situations of overload on the cable, that is if the tension on the cable increases for unpredictable reasons, guarantees a stoppage of the hydraulic motor and prevents any phenomenon of unwanted unwinding of the cable.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, one object of the invention is a cable recovery machine, comprising at least one hydraulic pump with variable cubic capacity provided with a system to adjust the cubic capacity driven by a servo controller and at least one hydraulic motor powered by the hydraulic pump by means of at least one pipe to deliver a fluid and at least one pipe to return the fluid.

According to one aspect of the invention, the recovery machine comprises a device to adjust the pressure of the fluid provided with at least one piloted proportional valve connected to the servo controller by means of a pipe to pilot the servo controller and provided with at least one maximum pressure proportional valve connected to a pipe connected to the hydraulic pump and in which pressurized fluid flows, said piloted proportional valve being connected to a pipe to discharge the fluid from the adjustment device and being able to commutate and put the pilot pipe into communication with the discharge pipe when the pressure of the fluid detected in at least one of either the delivery pipe or the return pipe of the hydraulic pump exceeds a set threshold pressure.

Advantageously, thanks to the possibility of placing the pilot channel of the servo controller integrated in the hydraulic pump in discharge conditions, when the set pressure limit is reached, the fluid necessary for the shutter of the hydraulic pump substantially fails, and it then returns to the zero position, that is, to the inactive position, maintaining the pressure in the circuit and therefore the set drawing value, that is, the tension value set for the cable to be drawn. In this way, the cable cannot be unwound by the recovery machine, thus guaranteeing high safety and effective intervention in the event of overload situations on the cable. The adjustment device with which the recovery machine is equipped therefore functions as a safety system for the proportional limitation of the drawing action applied to the cable, thanks in particular to the use of the piloted proportional valve.

According to another aspect of the invention, the present recovery machine can comprise an adjustment valve integrated in the hydraulic pump and able to detect and reduce the pressure.

The adjustment device can comprise a calibrated nozzle positioned along the pipe connected to the hydraulic pump and in which pressurized fluid flows. The pipe connected to the hydraulic pump is substantially the pipe in which the pressure of the fluid is to be controlled.

The adjustment device can also comprise a calibrated nozzle located upstream of the maximum pressure proportional valve.

In some embodiments, the present recovery machine can comprise a selector valve connected on one side and by means of corresponding pipes to the delivery and return pipes of the hydraulic pump and on the other side to the adjustment device.

In some embodiments, the selector valve can be positioned outside the hydraulic pump and the adjustment device.

In other embodiments, the selector valve can be integrated into the adjustment device.

According to other aspects of the invention, the adjustment device can detect, by means of an adjustment valve, the pressure of the fluid acting in the hydraulic motor, or the process pressure, only on the delivery pipe of the fluid to the hydraulic motor.

According to other aspects of the invention, the adjustment device can detect, by means of an adjustment valve, the pressure of the fluid acting in the hydraulic motor, or the process pressure, only from the return pipe of the fluid from the hydraulic motor.

The invention also concerns a cable-stringing plant, provided with at least one recovery machine and at least one brake machine; said recovery machine and said brake machine being positioned on opposite sides with respect to one or more intermediate supports of at least one cable to be strung.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
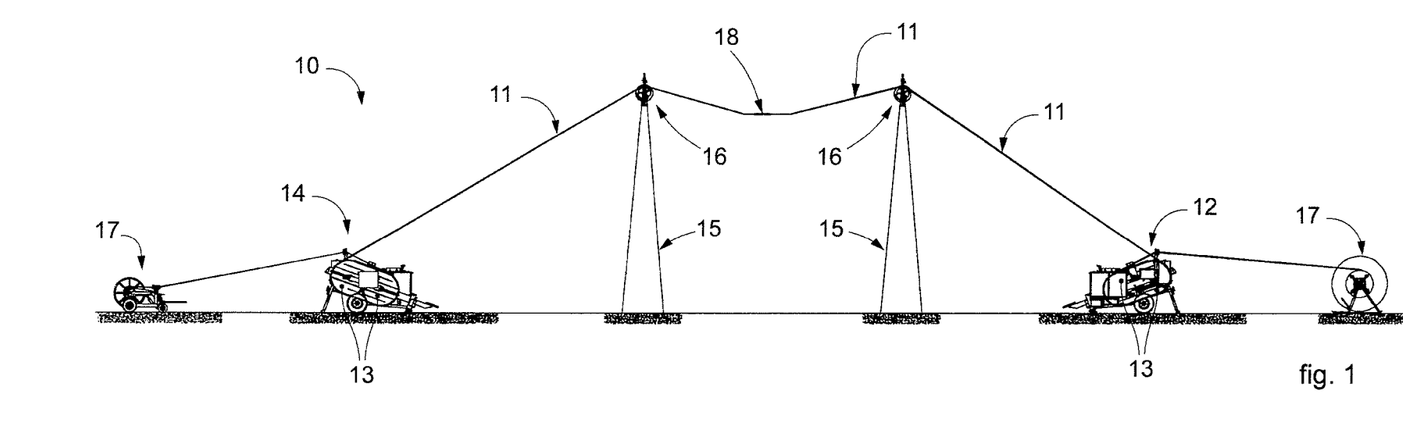
FIG. 1 is a schematic view of a cable-stringing plant provided with a cable recovery machine according to the present invention.

With reference to the attached drawings, FIG. 1 schematically shows a stringing plant 10 according to the present invention, configured to string one or more cables 11, or, for example, one or more electrical conductors of a high voltage overhead line. In FIG. 1, by way of non-restrictive example, a cable 11 is schematically shown.

For stringing the cable 11, the stringing plant 10 comprises at least one brake machine 12 and at least one recovery machine 14, for example a winch machine. Each of these machines is provided with one or more winding or unwinding members, or capstans 13.

The brake machine 12 and the recovery machine 14 could also be of the winch-brake type, that is, combined to selectively perform both the winch function and also the brake function.

At least one brake machine 12 and at least one recovery machine 14 are positioned on opposite sides with respect to intermediate supports 15, for example pylons, on which the cables 11 are strung. In the case where winch-brake machines are used, at least one winch-brake machine will be positioned on each side with respect to the intermediate supports.

On the intermediate supports 15, as can be seen, the cable 11 is strung on a pulley 16, or a roller way, on which, as is known, the cable 11 will be subjected to a certain curvature.

The cable 11 is fed to the stringing plant by means of at least one coil 17 disposed upstream of a brake machine 12, and is recovered downstream of the recovery machine 14 on a coil 17. Along the cable 11 a joint 18 is schematically shown, able to connect two sections of cable.

Figure 2:
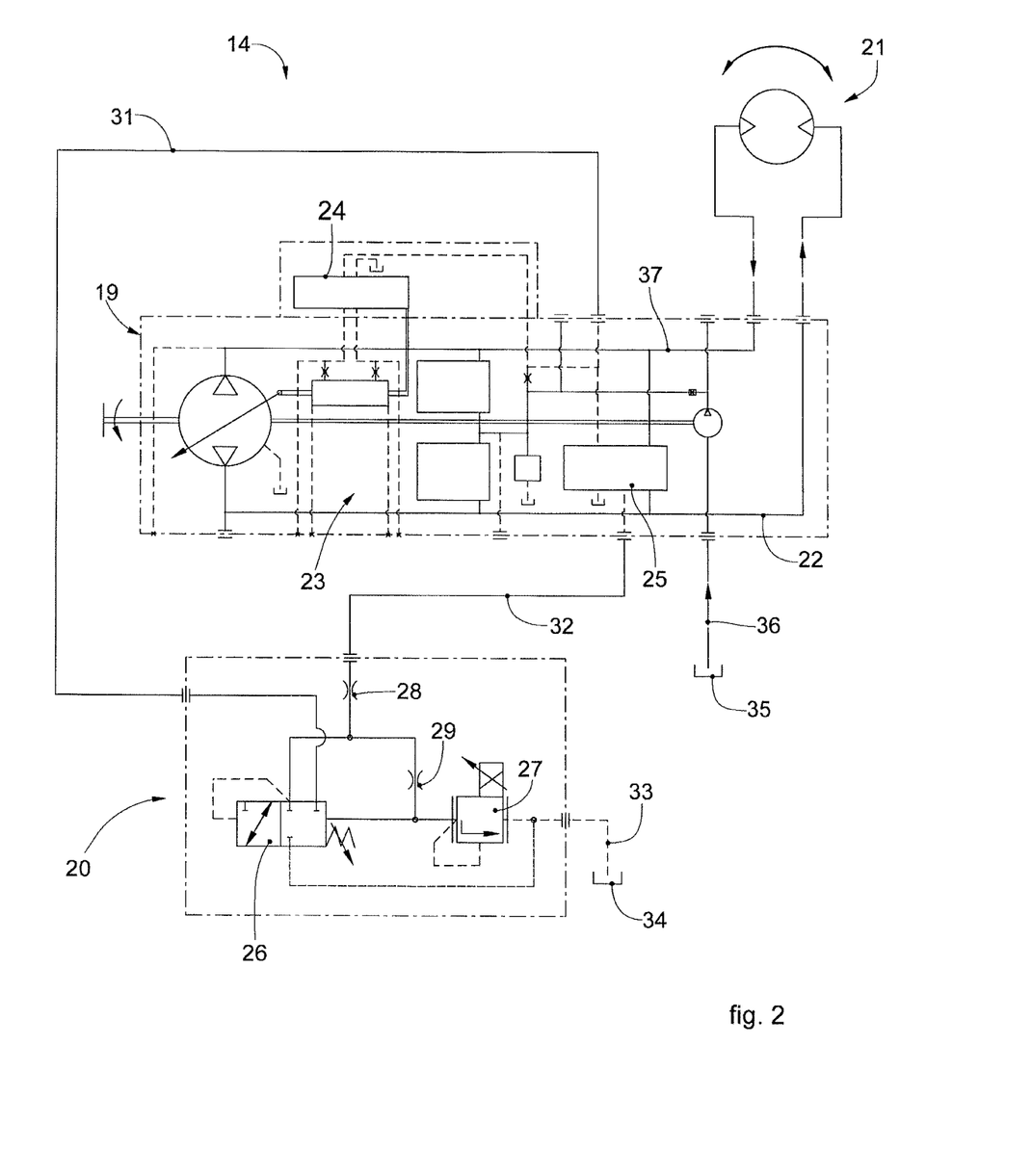
FIGS. 2 to 10 schematically show some variants of a hydraulic circuit of the recovery machine according to the present invention.

The recovery machine 14, see FIG. 2, comprises a hydraulic pump 19 with a variable cubic capacity, which feeds a hydraulic motor 21 by means of a delivery pipe for a fluid, for example the delivery pipe 22 or 37, and a return pipe for the fluid, for example the return pipe 37 or 22.

By way of non-restrictive example, hereafter in the description, the pipe 22 will be identified as the delivery pipe, while the pipe 37 will be identified as the return pipe, however these pipes could be inverted.

The hydraulic motor 21 is associated with the pair of capstans 13 used for unwinding and/or braking the cable 11.

The hydraulic pump 19 with variable cubic capacity comprises a system 23 for adjusting the cubic capacity and a servo controller 24 of the system 23 for adjusting the cubic capacity, that is, for proportional control of the cubic capacity.

The pressurized fluid, for example oil, necessary for the functioning of the recovery machine 14, can be taken from a tank 35 through a suitable pipe 36.

The recovery machine 14 is provided with a device 20 to adjust the fluid pressure, able to safely limit the drawing action on the cable 11, acting in particular on the system 23 to adjust the cubic capacity and on the servo controller 24. In particular, the adjustment device 20 acts on the system 23 to adjust the cubic capacity so as to ensure that, upon reaching a limit pressure, that is, the maximum drawing action exerted on the cable 11 and set by the operator, the cubic capacity of the hydraulic pump 19 decreases, if necessary to a value such as to stop the movement of the hydraulic motor 21 while maintaining the set pressure, so as not to lose the drawing action on the line and therefore not to release the cable 11, or conductor.

Unlike a traditional adjustment system, which can reverse the flow in the delivery and return pipes of the hydraulic pump, acting as a brake and releasing the cable, the present adjustment device 20 can at most bring the hydraulic pump 19 to a zero cubic capacity and stop the recovery machine 14, but in no way can it reverse the flow of oil between the hydraulic pump 19 and the hydraulic motor 21, which therefore can never turn in the opposite direction.

If the load acting on the hydraulic motor 21, that is, the tension of the cable 11, should increase for unpredictable reasons, since the adjustment device 20 is provided on a recovery machine 14, for example a winch machine, which supports the drawing action in line, the cubic capacity of the hydraulic pump 19 will remain zero and the hydraulic motor 21 will remain stationary. Therefore, in the event of any overload on the cable 11, the hydraulic motor 21 will maintain a tension value on the cable 11.

The adjustment device 20 therefore processes the pressure generated inside the hydraulic pump 19, which as we said acts on the hydraulic motor 21 which generates the drawing force of the recovery machine 14.

As we said, the hydraulic pump 19 is a pump with variable cubic capacity, for example with pistons, in a closed circuit and a pressure adjustment valve 25 can be integrated in it, in particular for cutting or lowering the pressure.

The adjustment device 20 can be formed by a hydraulic block, made of steel for example, in which the various housings are obtained for positioning, in some embodiments, a piloted proportional valve 26, a maximum pressure proportional valve 27 and calibrated nozzles 28 and 29.

The hydraulic pump 19 is connected to the adjustment device 20 by means of a first pipe 31 to pilot the servo controller 24 and by means of a second pipe 32, in which the pressure of the fluid is to be controlled.

Substantially, the pressurized fluid acting on the hydraulic motor 21, for example oil, passes through the pressure adjustment valve 25 integrated in the hydraulic pump 19 and arrives in the adjustment device 20 through the pipe 32.

In the adjustment device 20 there is the calibrated nozzle 28, positioned along the pipe 32 and able to dampen any pressure peaks and stabilize the recovery machine 14. The setting of the maximum pressure proportional valve 27 can be adjusted through a potentiometer or suchlike.

The maximum pressure proportional valve 27 is positioned downstream of the calibrated nozzle 29, able to generate an imbalance on the two sides of the slider of the piloted proportional valve 26.

When the set pressure is reached, the maximum pressure proportional valve 27 opens, unbalancing the slider of the piloted proportional valve 26, which removes the flow of fluid from the servo controller 24 and commutates, putting the pipe 31 that pilots the servo controller 24 of the system 23 for adjusting the cubic capacity of the hydraulic pump 19 into a discharge position. The excess fluid can be discharged through a pipe 33 into a suitable tank 34. In this way the pressure needed to bring the hydraulic pump 19 to the required cubic capacity fails.

Substantially, by allowing the discharge of the fluid from the pipe 31 that pilots the servo controller 24 of the system 23 to adjust the cubic capacity, that is, by allowing the connection of the pipe 31 with the pipe 33 through the piloted proportional valve 26, the fluid needed to command the shutter of the hydraulic pump 19 fails, and it therefore returns to the zero position, that is, the inactive position, maintaining the pressure in the circuit and therefore the drawing or tension value set for the cable, which therefore cannot be unwound.

If the pressure in the hydraulic circuit of the recovery machine 14 were to drop, the maximum pressure proportional valve 27 will close again, leaving the piloted proportional valve 26 to close again as well, restoring the pilot pressure of the servo controller 24 in the pipe 31, with a consequent return to the required cubic capacity, thanks to the system 23 to adjust the cubic capacity.

Figure 3:
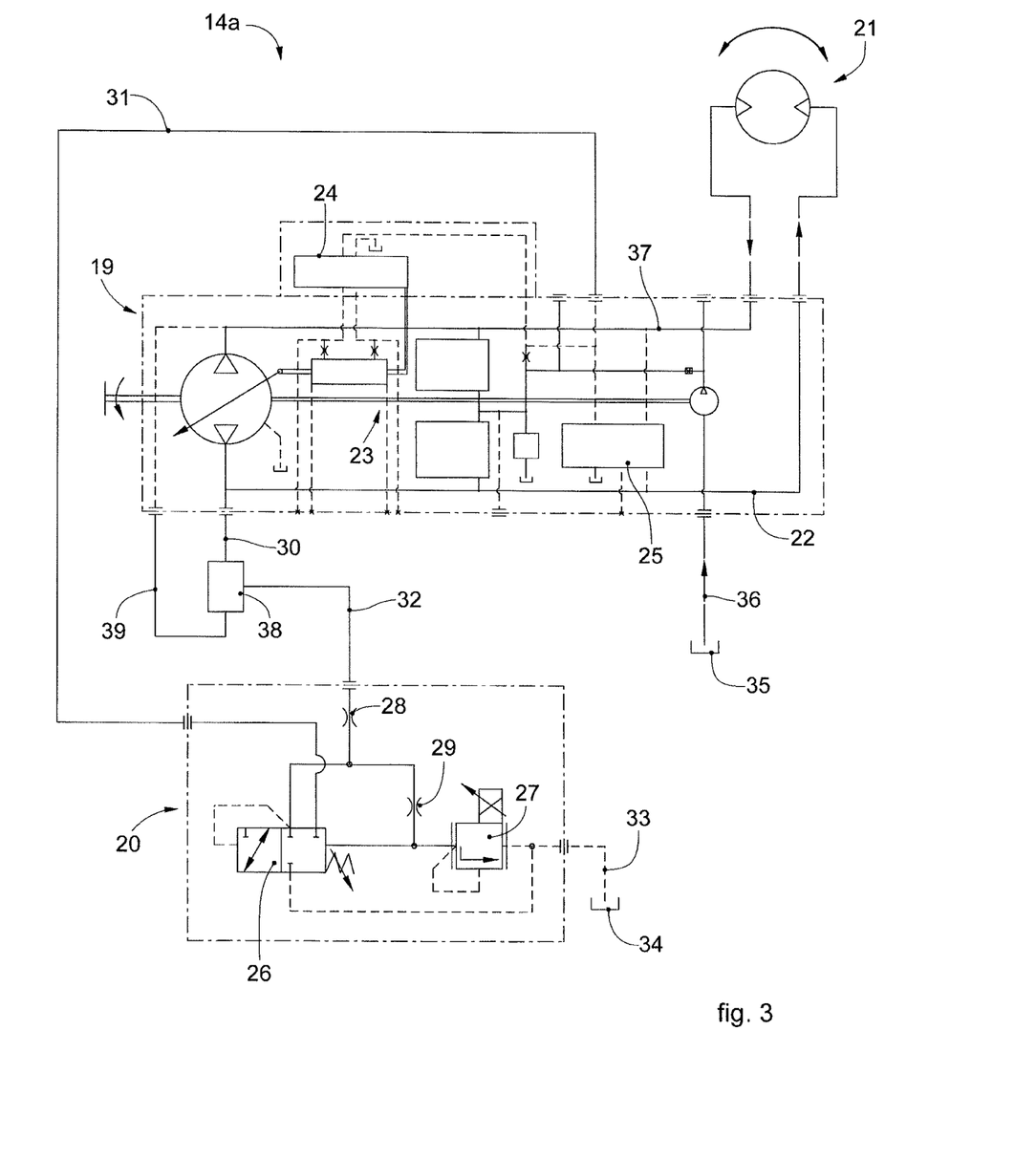

FIG. 3 shows a variant of the present cable recovery machine 14a, in which the process pressure of the fluid is obtained both from the delivery pipe 22 and also from the return pipe 37 of the hydraulic pump 19. In this case, a selector valve 38 is provided, connected on one side, by means of corresponding pipes 30 and 39, to the delivery and return pipes 22 and 37 of the hydraulic pump 19 and on the other side to the pipe 32. The selector valve 38 is outside both the adjustment device 20 and also the hydraulic pump 19.

The function of the selector valve 38 is substantially to select the pipe at higher pressure and send the fluid flowing there to the adjustment device 20.

Figure 4:
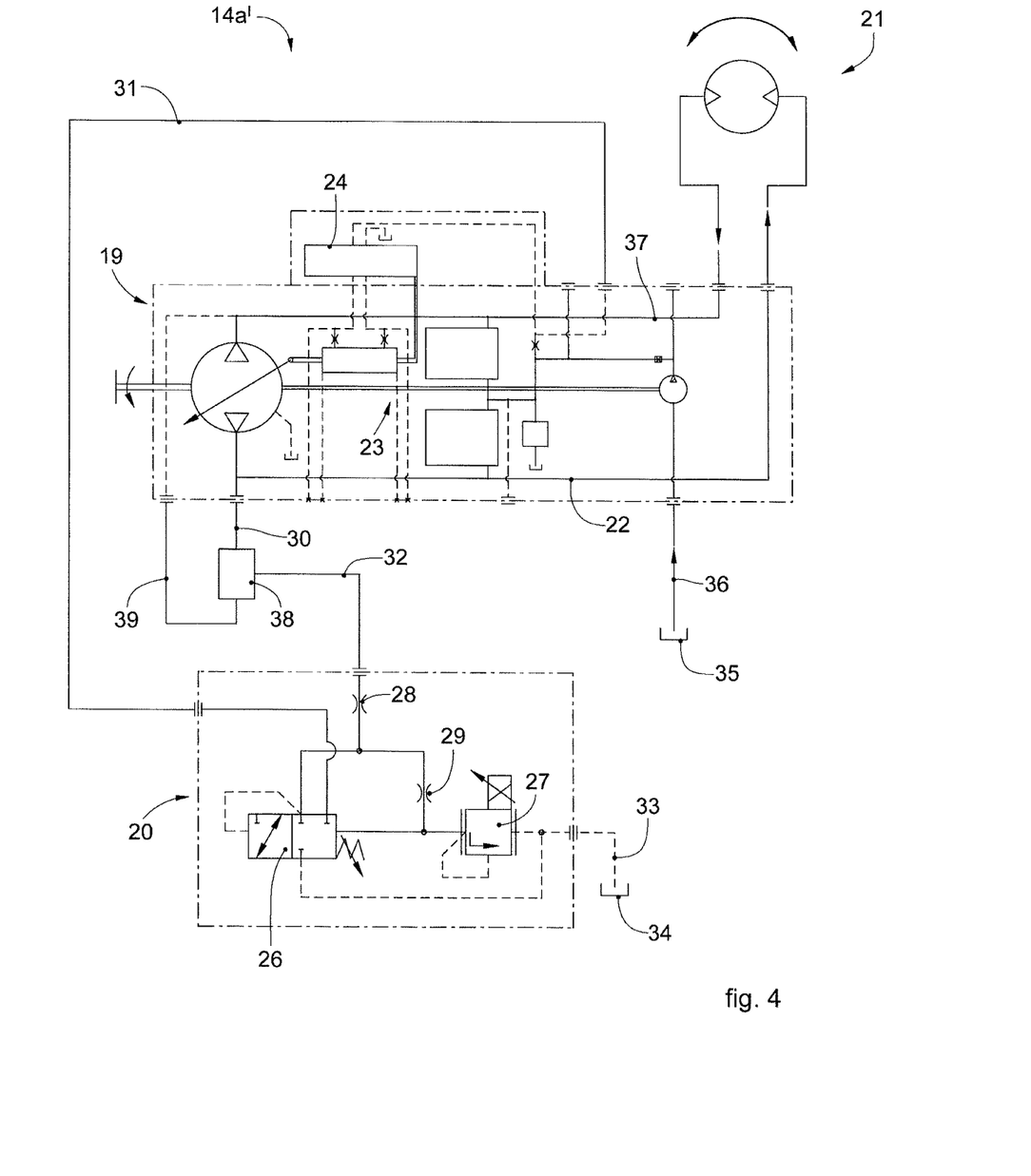

FIG. 4 shows a variant of the present recovery machine 14a' in which, compared to the recovery machine 14a in FIG. 3, the hydraulic pump 19 is not provided with the adjustment valve 25 integrated in it. The adjustment valve, able to allow the pressure cut, can be positioned outside the hydraulic pump 19.

Figure 5:
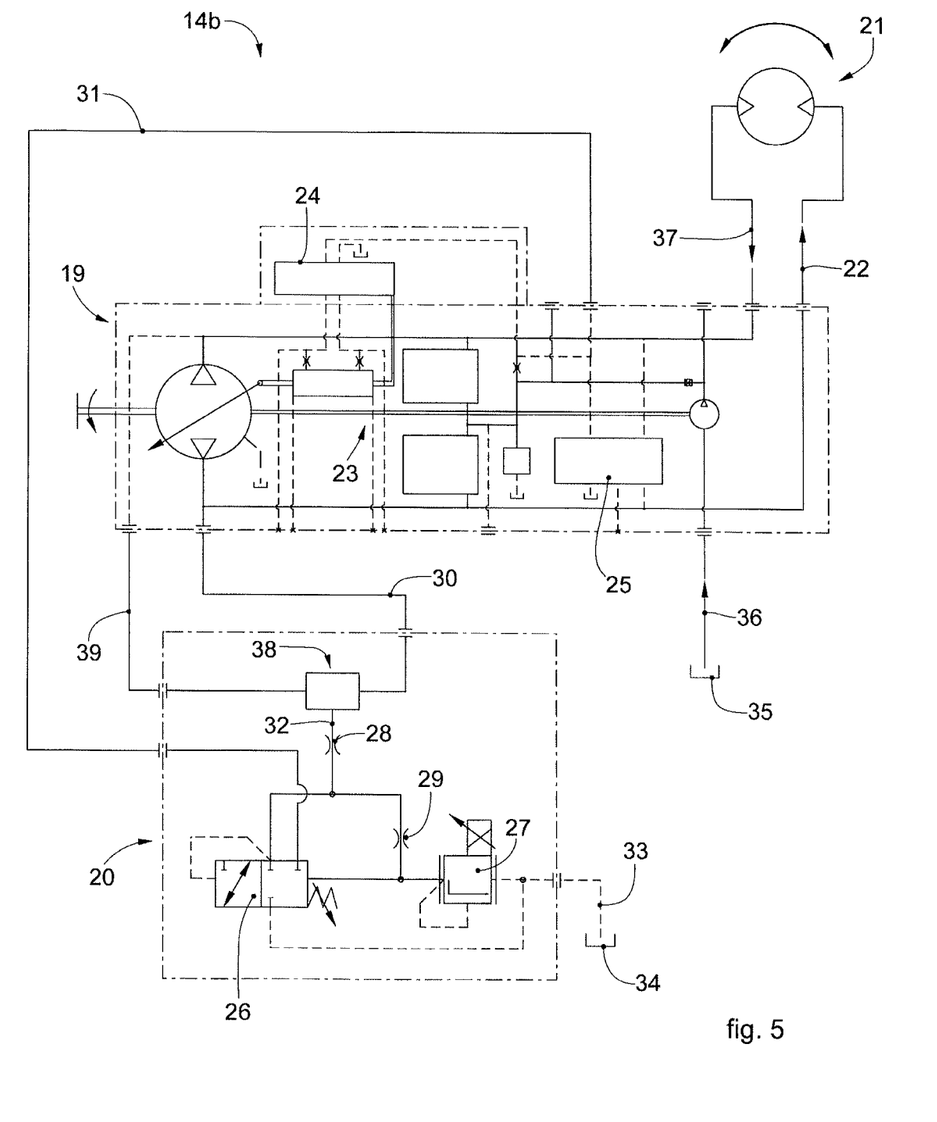

FIG. 5 shows a variant of the present recovery machine 14b, in which the process pressure of the fluid is obtained both from the delivery pipe 22 and also from the return pipe 37 of the hydraulic pump 19. In this case, a selector valve 38 is provided, connected on one side, by means of corresponding pipes 30 and 39, to the delivery and return pipes 22 and 37 of the hydraulic pump 19, and on the other side to the pipe 32. The selector valve 38 is inside the adjustment device 20.

Figure 6:
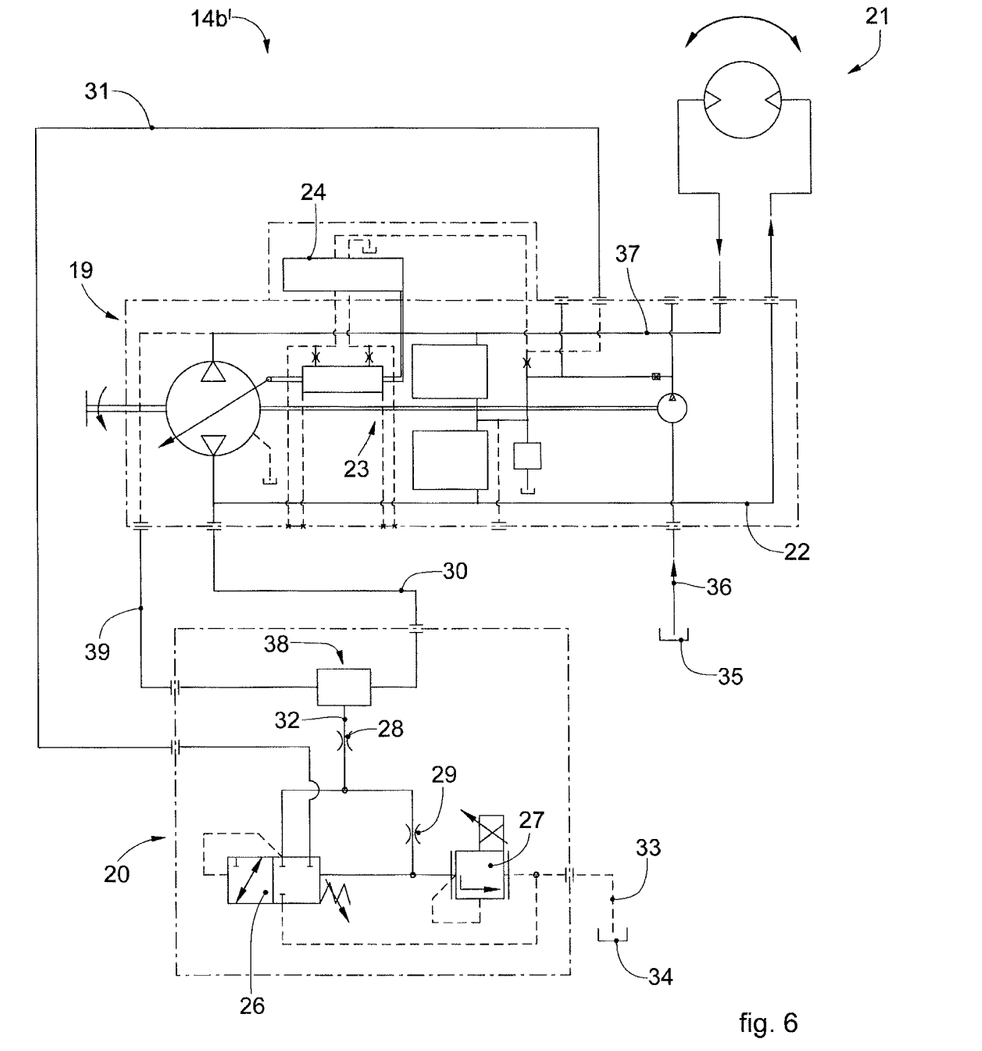

FIG. 6 shows a variant of the present recovery machine 14b' in which, compared to the recovery machine 14b in FIG. 5, the hydraulic pump 19 is not provided with the adjustment valve 25 integrated in it. The adjustment valve can be positioned outside the hydraulic pump 19.

Figure 7:
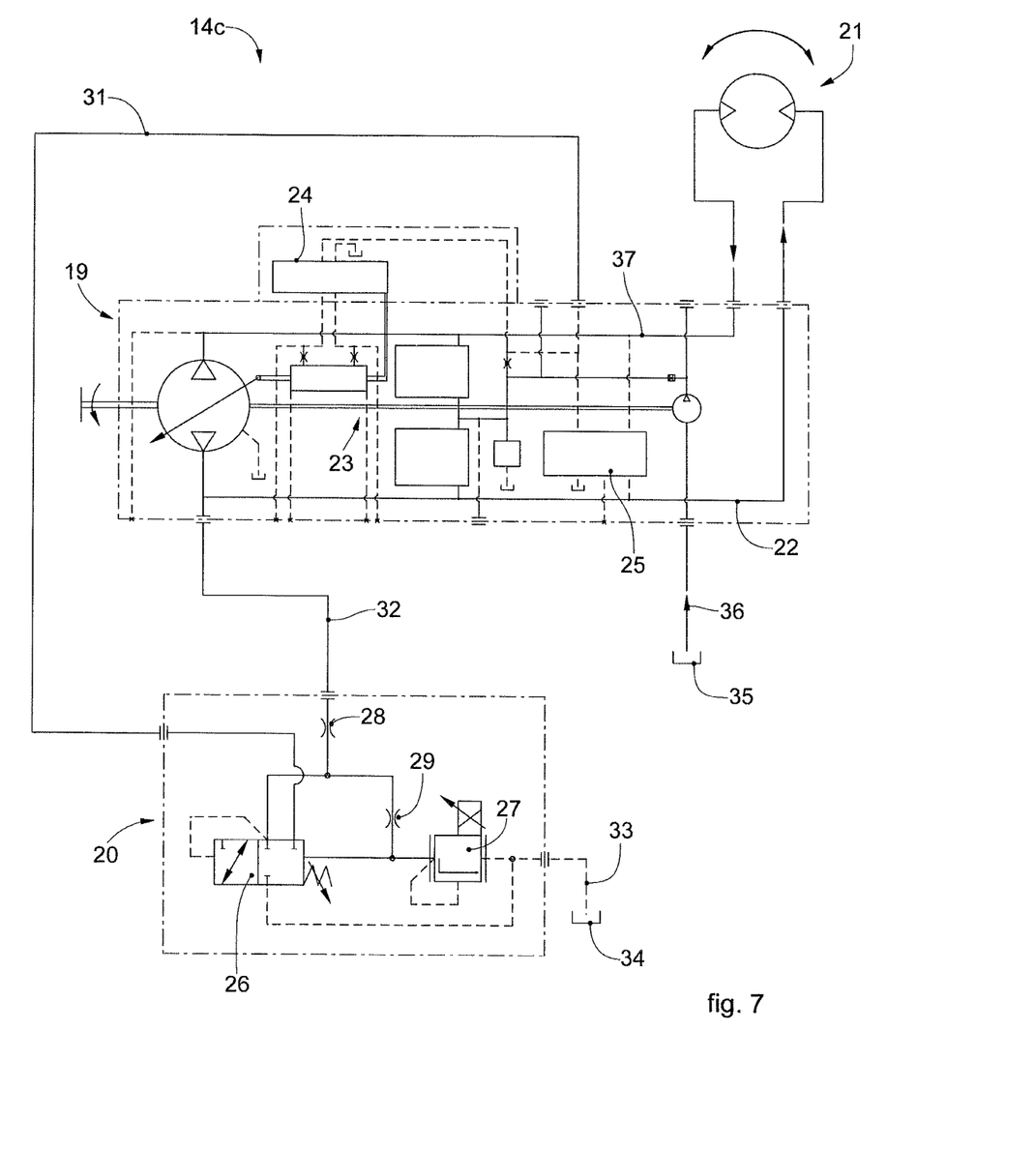

FIG. 7 shows a variant of the present recovery machine 14c in which the process pressure is obtained only from the delivery pipe 22 of the hydraulic pump 19, without using any selector valve to select the pipe with higher pressure. The adjustment valve 25 for cutting the pressure is integrated in the hydraulic pump 19.

Figure 8:
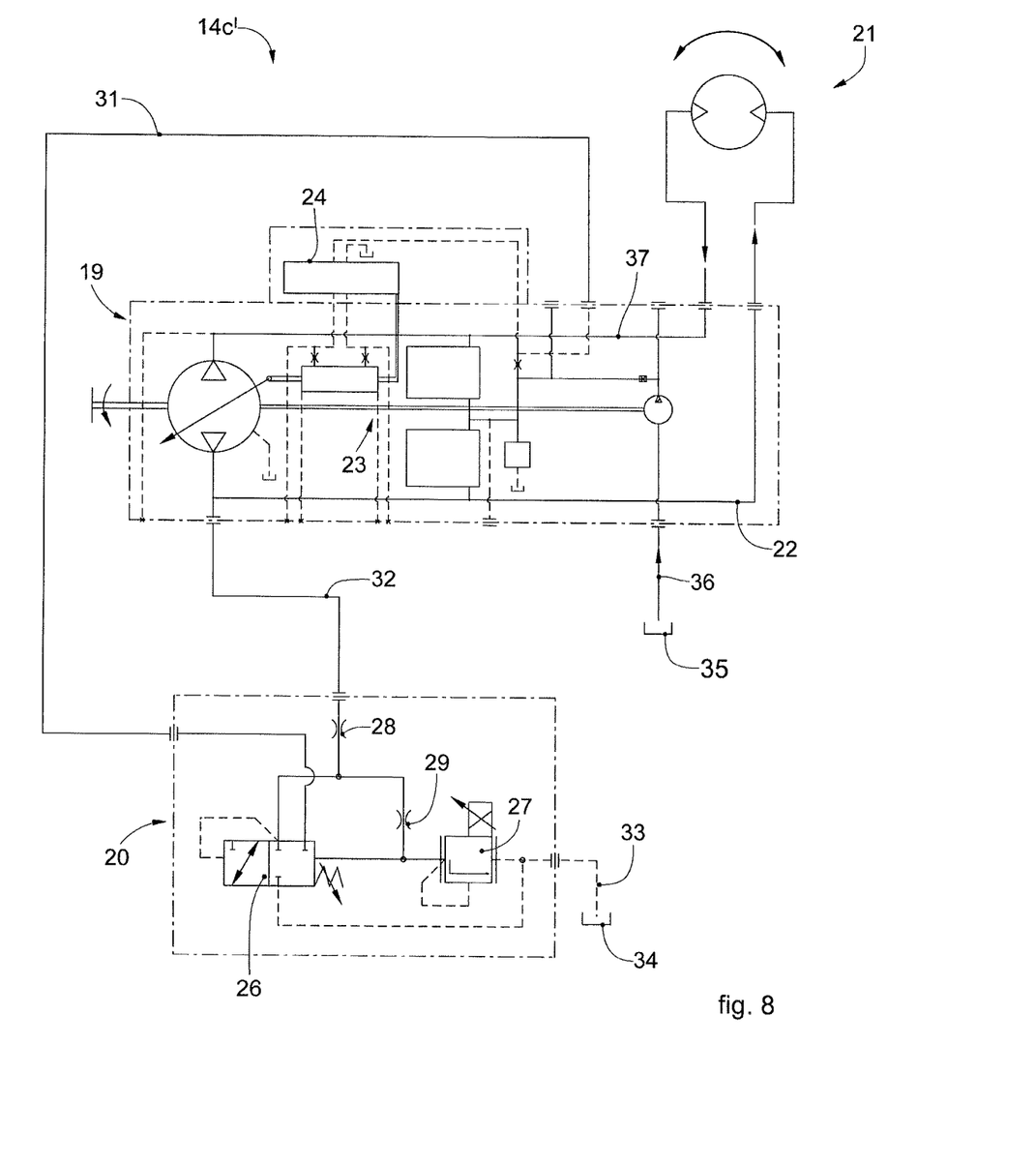

FIG. 8 shows a variant of the present recovery machine 14c' in which, compared to the recovery machine 14c in FIG. 7, the hydraulic pump 19 is not provided with the adjustment valve 25 integrated in it. The adjustment valve can be positioned outside the hydraulic pump 19.

Figure 9:
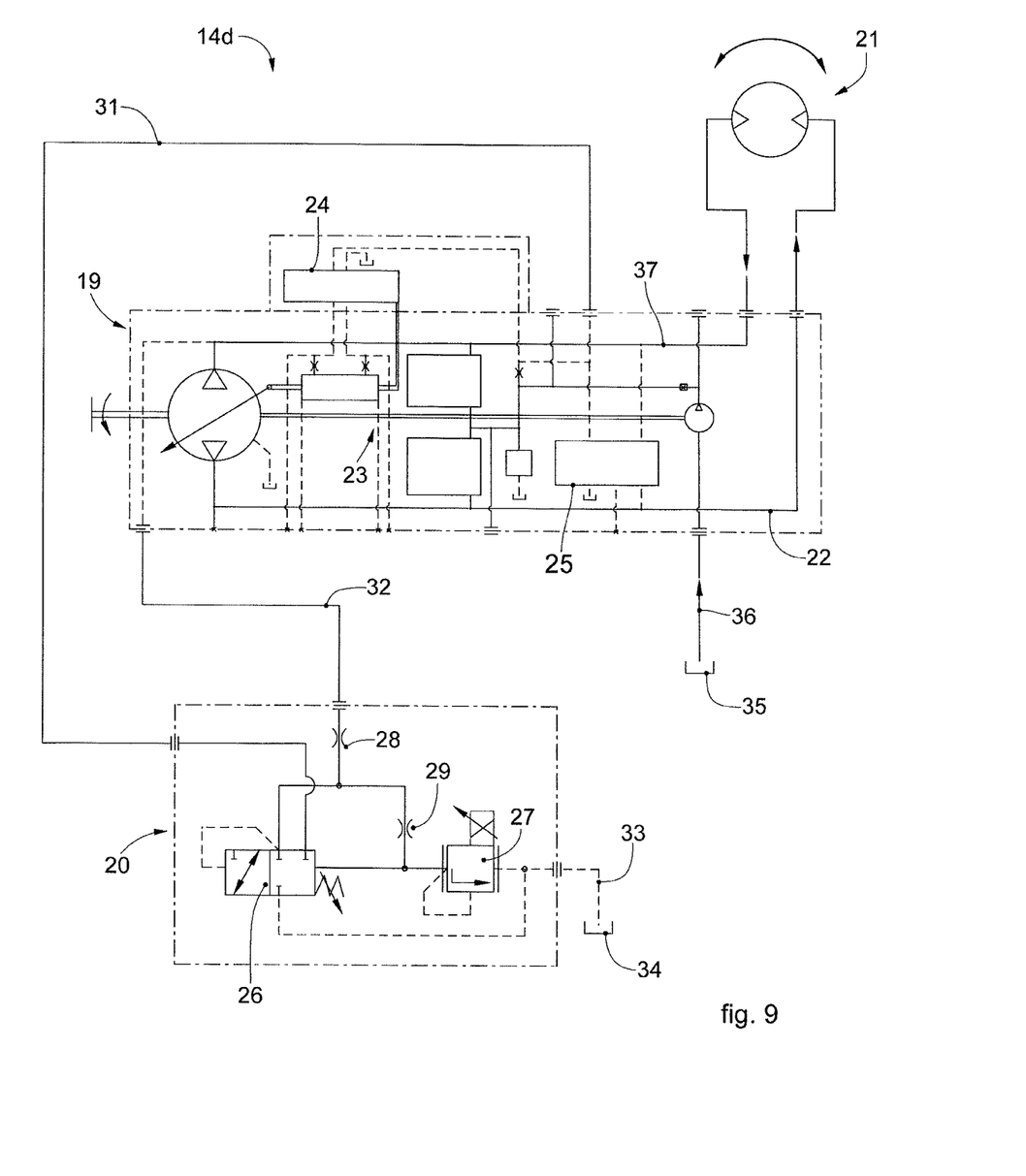

FIG. 9 shows a variant of the present recovery machine 14d in which the process pressure is obtained only from the return pipe 37 of the hydraulic pump 19, without using any selector valve to select the pipe with higher pressure. The adjustment valve 25 for cutting the pressure is integrated in the hydraulic pump 19.

Figure 10:
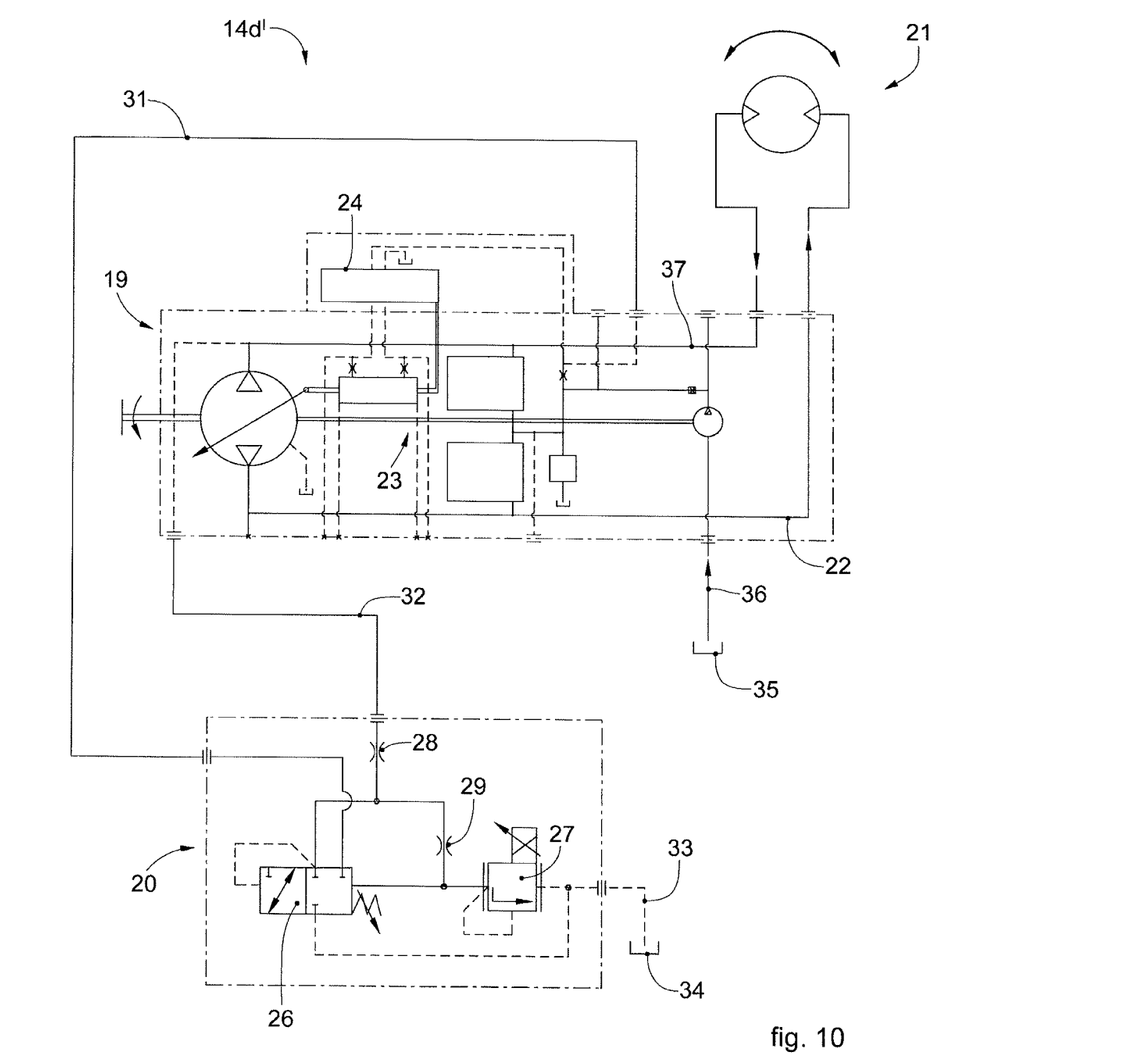

FIG. 10 shows a variant of the present recovery machine 14d' in which, compared to the recovery machine 14d in FIG. 9, the hydraulic pump 19 is not provided with the adjustment valve 25 integrated in it. The adjustment valve can be positioned outside the hydraulic pump 19.

It is clear that modifications and/or additions of parts may be made to the cable recovery machine as described heretofore, without departing from the field and scope of the present invention.

It is also clear that, although the present invention has been described with reference to some specific examples, a person of skill in the art shall certainly be able to achieve many other equivalent forms of cable recovery machine, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A machine to recover a cable, comprising:
at least one hydraulic pump with variable cubic capacity, provided with a system configured to adjust the cubic capacity, driven by a servo controller, and at least one hydraulic motor fed by said hydraulic pump by means of at least one pipe to deliver a fluid and at least one pipe to return the fluid, said recovery machine being characterized in that it comprises a device to adjust the pressure of the fluid provided with at least one piloted proportional valve connected to said servo controller by means of a pipe to pilot the servo controller and provided with at least one maximum pressure proportional valve connected to a pipe connected to the hydraulic pump and in which pressurized fluid flows, said piloted proportional valve being connected to a pipe to discharge the fluid from said adjustment device and being able to commutate and put said pilot pipe into communication with said discharge pipe when the pressure of the fluid detected in at least one of either the delivery pipe or the return pipe of the hydraulic pump exceeds a set threshold pressure.

2. The recovery machine of claim 1, further comprising an adjustment valve integrated in the hydraulic pump and able to detect and reduce the pressure.

3. The recovery machine of claim 1, wherein said adjustment device comprises a calibrated nozzle (28) positioned along said pipe connected to the hydraulic pump.

4. The recovery machine of claim 1, wherein said adjustment device comprises a calibrated nozzle located upstream of the maximum pressure proportional valve.

5. The recovery machine of claim 1, further comprising a selector valve (38) connected on one side and by means of corresponding pipes to the delivery and return pipes of the hydraulic pump, and on the other side to the adjustment device.

6. The recovery machine of claim 5, wherein said selector valve is positioned externally to the hydraulic pump and to the adjustment device.

7. The recovery machine of claim 5, wherein said selector valve (38) is integrated in the adjustment device (20).

8. The recovery machine of claim 1, wherein said adjustment device (20) detects, by means of an adjustment valve (25), the pressure of the fluid acting in the hydraulic motor (21), that is, the process pressure, only from the fluid delivery pipe (22) to the hydraulic motor (21).

9. The recovery machine of claim 1, wherein said adjustment device detects, by means of an adjustment valve, the pressure of the fluid acting in the hydraulic motor, that is, the process pressure, only from the fluid return pipe from the hydraulic motor.

10. A plant for stringing cables, provided with at least one recovery machine as in claim 1 and at least one brake machine, said recovery machine and said brake machine being positioned on opposite sides with respect to one or more intermediate supports of at least one cable to be strung.

* * * * *